(No Model.)

E. W. PERRY, Jr.
PLATE HOLDER FOR PHOTOGRAPHIC APPARATUS.

No. 458,979. Patented Sept. 1, 1891.

Witnesses.
Robt Ewett.
J. A. Rutherford.

Inventor:
Enoch W. Perry, Jr.
By James L. Norris.
Atty.

UNITED STATES PATENT OFFICE.

ENOCH WOOD PERRY, JR., OF NEW YORK, N. Y., ASSIGNOR OF ONE-HALF TO EMIL KIPPER, OF ADAMS, MASSACHUSETTS.

PLATE-HOLDER FOR PHOTOGRAPHIC APPARATUS.

SPECIFICATION forming part of Letters Patent No. 458,979, dated September 1, 1891.

Application filed February 20, 1890. Serial No. 341,100. (No model.)

*To all whom it may concern:*

Be it known that I, ENOCH WOOD PERRY, Jr., a citizen of the United States, residing at New York, in the county of New York and State of New York, have invented new and useful Improvements in Plate-Holders for Photographic Apparatus, of which the following is a specification.

My invention relates to plate-holders for photographic cameras, and the purpose thereof is to provide novel and simple means whereby a series of flexible negative-films may be successively exposed and after exposure removed to the rear or to another part of the plate-holding compartment, the next succeeding film being uncovered by such removal and exposed in turn.

The invention consists to this end in the novel features of construction and new mechanical combinations hereinafter fully set forth, and then definitely pointed out in the claims following this specification.

Figure 1:
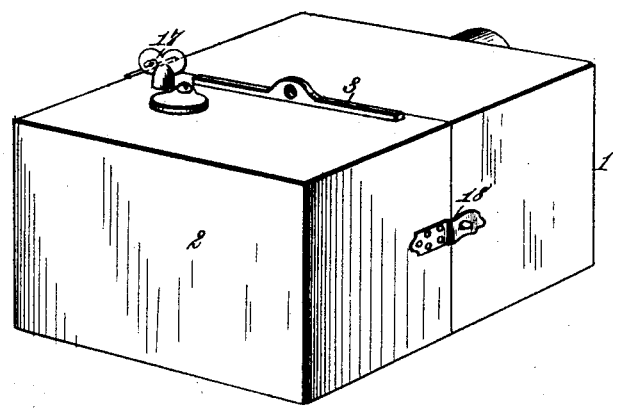
Figure 2:
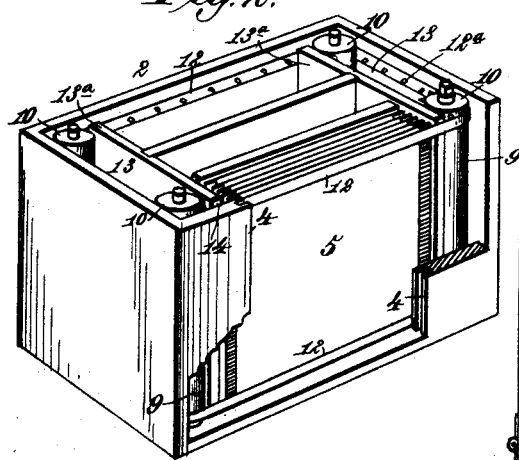
Figure 4:
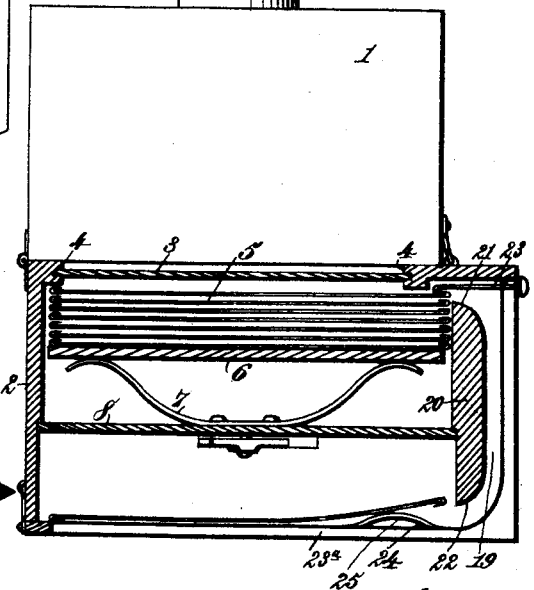
Figure 3:
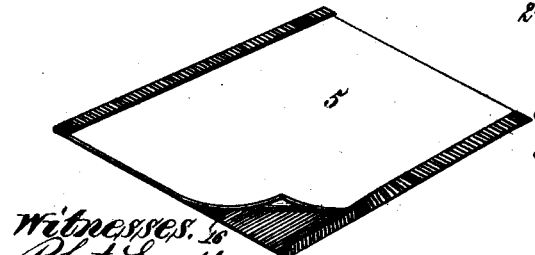

Referring to the drawings, Figure 1 is a perspective view of a camera and plate-holder connected together. Fig. 2 is a perspective view of the plate-holder, showing its interior and the means for shifting or moving the films from their exposed position to the side, rear, or other portion of the plate-holding chamber. Fig. 3 is a detail view of one of the films. Fig. 4 is a horizontal section of a plate-holder, showing a modification.

In the said drawings, the reference-numeral 1 designates the camera, which may be of any desired form or construction.

The numeral 2 denotes the plate-holder composed of any suitable form of casing, which may extend beyond, but be attached to, the camera-box by any suitable means, whereby access to the interior of the plate-holder may be had. Within the plate-holder is arranged a cut-off plate 3, sliding in vertical ways or guides 4 and forming a barrier to the passage of light when shut, said cut-off plate lying immediately in front of the series of films arranged in the plate-holder. Immediately behind the cut-off plate 3 I arrange a stack or series of films 5, their ends resting against the edges of the ways 4, in which said cut-off is supported. Behind the stack or series of plates I place a plate 6, against which one or more springs 7 have bearing, said springs being mounted on a detachable base 8. The ends of the plate-holding compartment or chamber are formed, respectively, by partition-walls $13^a$ $13^a$, located at a distance from the end walls of the casing 2 to constitute a transverse plate-receiving compartment 13 at each end, which extends at right angles, or substantially so, to the cut-off plate 3 and the flexible films 5 in the plate-holding or photographic compartment.

In the ends of the plate-holding compartment I arrange shafts 9, carrying reels 10, over which are stretched one or more bands 12, said reels (one or more) being cogged, and one or more of said bands being provided with teeth or grips $12^a$, which engage the ends of the films and carry the latter with them. The bands 12 travel in front of the films and preferably over or near and parallel to its lower edges, and when the rolls are operated the teeth on said bands draw the foremost exposed film (shown in Fig. 2) into the rear of the plate-holding compartment and behind the spring-holding plate or base 8.

At each end of the plate-holding chamber is the transverse plate-receiving compartments 13, in which are located the rolls 10, said compartments communicating with the main plate-holder by means of openings 14, traversed by the bands 12, as shown, said bands being formed of steel or other metal or of any suitable flexible substance and with teeth or gripping devices which give a firm and positive engagement with the actuating-roll 10 and also assists in taking hold of the films. The flexible films 5 consist of any suitable material, such as zylonite backed by opaque cloth, paper, or other substance 16, adapted to intercept the actinic rays of light. If cloth or paper is used, the backing may be extended far enough to overlap the margins of the film, and being turned over thereon it gives a re-enforcement to the body of the film. The rolls carrying the bands 12 may be actuated by a key 17, applied to the journal of one of the rolls 10.

I may connect the plate-holder to the camera by means of a hinge-joint at one end and a catch 18 at the other end, uniting the swinging end to the camera; or I may simply construct the rear wall of the plate-holder as a door. I may also employ the modified form shown in Fig. 4, in which the rolls and bands are dispensed with, the films being drawn successively from the position of exposure into the rear or other part of the plate-holder. For this purpose I may provide the transverse plate-receiving compartment or chamber 19 in the plate-holder, said chamber being separated from the plate-holding or photographic chamber by a partition-wall 20, with a convex outer face, and passages 21 and 22 being provided at the ends of said bulk-head and at the flexible films being shifted by a carrier or other device 23, inserted through a slot 23ᵃ, running horizontally in the walls of the plate-holder. This carrier is adapted to engage with the ends of the flexible films and withdraw them successively from the stack where they are exposed, said carrier moving in the horizontal slot in the wall of the plate-carrier and drawing the flexible films over the convex face of the bulk-head 20, thereby lodging them in rear of the stack or, if preferred, at the side. Should the films be drawn or shifted to the rear, I may place in the modified construction (shown in Fig. 4) a guide-plate 24, lying in or near the passage 23ᵃ, just outside which it may be carried upward, as shown at 25, whereby the films as they pass over the same are raised and held, leaving an unobstructed passage for the next ensuing film. This plate may also be used in the construction shown in Figs. 1 and 2 to release the films from engagement with the belts or bands.

The holders described are in any form applicable to any kind of camera and are especially useful in those cameras which are focused by mirrors reflecting the image to the upper side or top of the camera.

When used with a reflecting-mirror, the holder is left in or attached to the camera, or it may be made an undetachable part of the same.

It is evident that the plates, instead of being deposited in the back of the plate-holder, may be shifted to either one of the four sides of the plate-holder, although this might possibly require a deeper apparatus proportioned to the size and number of plates or films used. Moreover, other mechanical means than those described herein may be employed to shift or transpose the films to the side or rear, and I do not herein limit myself to the specific mechanism for shifting or transposing the separate films from the position of exposure.

In place of the four shafts shown I may employ two shafts or rolls only to convey the transposing-bands, one shaft being placed at each end of the plate-holder and being of such diameter as to carry the parallel portions of the bands in front of and behind the stack of plates or films. In this construction the ends of the plate-holder will necessarily be shaped to accommodate the increased diameter of the rolls.

Plate-holders have heretofore been provided with slides adapted to be reciprocated in right lines to successively move rigid plate-holding frames from one chamber to another; but my invention differs from prior apparatus of this kind in that I employ a film-carrier which moves a flexible film from the photographic chamber around a partition-wall into a transverse receiving-chamber located at approximately right angles to the cut-off plate and the films in the photographing-chamber, the construction being such also that, if desired, the flexible films can be moved through said transverse chamber, and thence laterally at right angles thereto into a chamber directly behind or in rear of the spring-pressed plate or follower that moves the superposed films in the photographing-chamber up to the required position for exposure.

For convenience of description I may term the band or bands 12 of the device 23 a "film-carrier," in that they engage a film and carry it first longitudinally in a plane parallel to the cut-off plate, and thence laterally at right angles into the transverse receiving-chamber and, if desired, again laterally from the receiving-chamber to a follower.

For the purpose of my invention the negative-films are flexible and the film-carrier is capable of movement in planes at right angles to each other, in order that the film may be carried around the partition-wall into the transverse receiving-chamber.

I do not herein broadly claim the combination, with a plate-holder, of a plate-receiver arranged in rear thereof and a rotary transferring device, whereby the exposed plates are successively impelled from the position of exposure to the plate-receiver, as such is claimed in my application filed of even date herewith, Serial No. 341,102.

What I claim is—

1. In a photographic camera, the combination of a plate-holder having a photographing-chamber and a transverse receiving-chamber extending approximately at right angles to the flexible plates or films in said holder, and a carrier movable in planes substantially at right angles to each other for moving the flexible films from the photographing-chamber and carrying them thence laterally around into the transverse receiving-chamber.

2. In a camera, the combination, with a multiple film or plate holder, of one or more traveling bands and pulleys operating the same, the bands being provided with teeth or gripping devices to engage the ends of the flexible films, substantially as described.

3. In a photographic camera, the combination, with a holder having a photographing-chamber for flexible plates or films, of a transverse receiving-chamber separated from the photographing-chamber by a partition-wall, and a film-carrier movable in planes at right angles to each other for drawing a film from the photographing-chamber and carrying it thence around substantially at right angles into the transverse receiving-chamber.

4. In a photographic camera, the combination of the holder having a photographing-chamber containing a spring-pressed follower, a transverse receiving-chamber arranged substantially at right angles to the plane of movement of the follower and separated from the photographing-chamber by a partition-wall, and a chamber in rear of the spring-pressed follower, with a film-carrier movable through the transverse chamber and thence laterally substantially at right angles thereto for moving the films around to a position in rear of the spring-pressed follower.

5. In a camera, the combination, with the multiple film or plate holder, of one or more traveling bands provided with teeth or projections to engage the sensitive film or its holder, substantially as described.

In testimony whereof I have affixed my signature in presence of two witnesses.

ENOCH WOOD PERRY, JR.

Witnesses:
   EDW. L. COWELL,
   THOMAS FORD.